(12) United States Patent
Yim et al.

(10) Patent No.: US 9,832,599 B2
(45) Date of Patent: Nov. 28, 2017

(54) METHOD OF SHARING DATA BETWEEN ELECTRONIC DEVICES

(71) Applicant: TomTom International B.V., Amsterdam (NL)

(72) Inventors: Sok Yee Sophie Yim, Wembley (GB); Francesco Lodolo, London (GB); Rolf Dorland, Lelystad (NL)

(73) Assignee: TomTom Navigation B.V., Amsterdam (NL)

( * ) Notice: Subject to any disclaimer, the term of this patent is extended or adjusted under 35 U.S.C. 154(b) by 0 days.

(21) Appl. No.: 14/936,816

(22) Filed: Nov. 10, 2015

(65) Prior Publication Data

US 2016/0134998 A1 May 12, 2016

(30) Foreign Application Priority Data

Nov. 10, 2014 (GB) .................................. 1419950.9

(51) Int. Cl.
| | |
|---|---|
| *H04B 7/00* | (2006.01) |
| *H04W 4/00* | (2009.01) |
| *G01C 21/36* | (2006.01) |
| *H04W 4/02* | (2009.01) |
| *H04W 8/00* | (2009.01) |
| *H04W 76/02* | (2009.01) |
| *H04W 88/04* | (2009.01) |

(52) U.S. Cl.
CPC .......... *H04W 4/008* (2013.01); *G01C 21/362* (2013.01); *G01C 21/3688* (2013.01); *H04W 4/02* (2013.01); *H04W 8/005* (2013.01); *H04W 76/023* (2013.01); *H04W 88/04* (2013.01)

(58) Field of Classification Search
CPC ... H04W 76/023; H04W 48/20; H04W 4/008; H04W 4/02; H04W 4/028; H04W 88/04; H04W 8/005; G01C 21/362; G01C 21/3688
USPC .......................................................... 455/41.2
See application file for complete search history.

(56) References Cited

U.S. PATENT DOCUMENTS

| | | | |
|---|---|---|---|
| 8,271,662 B1 | 9/2012 | Gossweiler, III et al. | |
| 2007/0188323 A1* | 8/2007 | Sinclair | G06F 21/445 340/568.1 |
| 2008/0195735 A1 | 8/2008 | Hodges et al. | |
| 2009/0024770 A1 | 1/2009 | Dubs et al. | |
| 2011/0069184 A1* | 3/2011 | Go | H04N 1/0035 348/207.1 |

(Continued)

OTHER PUBLICATIONS

Search report dated May 19, 2015 for GB application No. 1419950.9 performed by the UKIPO.

(Continued)

*Primary Examiner* — Ajibola Akinyemi (57) ABSTRACT

Embodiments of the present invention provide a method of sharing data between devices, comprising determining an event at each of first and second devices, determining a time of the event at each of the first and second devices based on data wirelessly received at the first and second devices, and associating the first and second devices via a communication protocol to enable data communication therebetween if a time derived from an identifier of at least one of the devices used in the association is within a predetermined window of the time of the event at the other device.

18 Claims, 5 Drawing Sheets

(56) References Cited

U.S. PATENT DOCUMENTS

| | | | |
|---|---|---|---|
| 2011/0098913 A1* | 4/2011 | Shcherbatyuk | G01C 21/36 701/532 |
| 2011/0126014 A1 | 5/2011 | Camp, Jr. et al. | |
| 2012/0050153 A1 | 3/2012 | Dvortsov et al. | |
| 2013/0171935 A1 | 7/2013 | Tsai et al. | |
| 2013/0231760 A1* | 9/2013 | Rosen | G06F 17/40 700/91 |
| 2014/0199967 A1 | 7/2014 | Varoglu et al. | |

OTHER PUBLICATIONS

Anonymous: Bump (application) Wikipedia, the free encyclopedia Oct. 21, 2014 (Oct. 21, 2014), XP002756270, Retrieved from the Internet: URL:https://en.wikipedia.org/w/index.php?title=Bump_%28application%29&oldid=630473197 [retrieved on May 8, 2016].

Hinckley K Ed—Association for Computing Machinery: 11 Synchronous gestures for multiple persons and computers Proceedings of the 16th Annual ACM Symposium on User Interface Software and Technology: Vancouver, Canada, Nov. 2-5, 2003.

* cited by examiner

METHOD OF SHARING DATA BETWEEN ELECTRONIC DEVICES

CROSS REFERENCE TO RELATED APPLICATIONS

This application claims the benefit of United Kingdom Patent Application No. 1419950.9 filed Nov. 10, 2014. The entire content of this application is incorporated herein by reference.

FIELD OF THE INVENTION

This invention relates to methods and systems for sharing data between devices, such as portable or mobile devices. Illustrative embodiments of the invention relate to navigation devices that include means for determining their current position, and wherein the data being exchanged relates, for example, to geographic data that can be used as a destination in a route planning operation.

BACKGROUND TO THE INVENTION

Portable navigation devices (PNDs) that include global navigation satellite systems (GNSS), e.g. global positioning system (GPS), signal reception and processing functionality are well known, and are widely employed as in-car or other vehicle navigation systems. It will be appreciated, that portable navigation devices may use other means to determine their location, such as using the mobile telecommunications, surface beacons or the like.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

It is often desired to share data between navigation devices, and particularly between portable or mobile navigation devices. A common way to share data is to establish a wireless communication channel between devices using a short-range wireless communication protocol, such as Bluetooth or Wi-Fi. Most such protocols use a similar device discovery and connection establishment procedure in which a first device performs a search of other discoverable devices that are within range, e.g. typically 10 meters in the case of Bluetooth; each of these other devices providing, in response, an identifier (or "profile") to the first device. Using these identifiers, a user, for example, can select a device within range and a connection request is then sent to this device in order to set-up a data connection between the two devices. The data connection is typically formed by transceivers of the two devices being tuned to the same frequency at the same time.

If it is desired to regularly share data between devices, or the users of those devices, then a user of a first device can store an identifier, i.e. the profile, for a second device, such that a connection can be automatically made between the first and second devices whenever they are in range of each other. It can therefore take a relatively long period of time, or at least require a number of user inputs, to establish a data connection between a pair of devices the first time it is desired to exchange information, but all subsequent connections occur quickly and with minimal, or no, user interaction.

In situations when it is desirable to share data between devices only infrequently, or even on a one-off basis, it has been recognised that establishing a connection between devices remains cumbersome and time consuming. It is therefore desired to provide an improved method and devices for establishing a data connection by which information can be shared.

SUMMARY OF THE INVENTION

According to a first aspect of the invention, there is provided a method of establishing a connection between first and second portable electronic devices, comprising:

determining an occurrence of an event at a first portable electronic device;

determining a time of the event at the first device based on data wirelessly received at the first device;

wirelessly receiving, at the first device, an identifier for a second portable electronic device;

using the received identifier to determine a time of the occurrence of an event at the second device; and wirelessly sending a connection request from the first device to the second device to establish a connection between the first and second devices enabling wireless data communication therebetween, when the time determined from the received identifier is within a predetermined time window of the determined time of the event at the first device.

In embodiments, the first portable electronic device typically acts as a "sender", and thus sends information to the second portable electronic device (or "receiver") once the connection is established. In other embodiments, the first device can additionally, or alternatively, act as the receiver, and thus receive information from the second device once the connection is established.

As will be appreciated, the present invention encompasses the corresponding steps that occur on the second device in order to establish the connection. Thus, according to a second aspect of the invention, there is provided a method of establishing a connection between first and second portable electronic devices, comprising:

determining an occurrence of an event at a first portable electronic device;

determining a time of the event at the first device based on data wirelessly received at the first device;

setting an identifier of the first device using the determined time of the event at the first device;

wirelessly transmitting the identifier to a second portable electronic device; and wirelessly receiving a connection request from the second device to establish a connection between the first and second devices enabling wireless data communication therebetween.

The present invention provides a method of wirelessly sharing data between devices, and more specifically to a convenient method of establishing a data connection between devices, even if a connection has not been made between the devices in the past. In particular, the present invention relies on the near simultaneous occurrence of an event on each of first and second devices, with the determined time of the event being used as the identifier for a device, such that the device can be easily found during the discovery process. The present invention, as will be discussed in more detail below, is also able to function in the absence of an internet connection, such as is required to communicate with a server computer.

The event that initiates the establishing of a connection between devices can take a number of forms, and indeed can be different between devices (as long as the event is associated with the functionality of the invention). Preferably, however, the same type of event is used by both the first and second devices. It will also be appreciated that the event is a predetermined event, or in other words is of an expected type or form.

In an embodiment, the event can be the first device being touched, or "bumped", against the second device. Such a bump can be detected by one or more accelerometers within each of the first and second devices. Additionally or alternatively, the event can be a user input received at the first device and/or second device, e.g. using an user input device. The user input can be one of the activation of a hard button, the activation of a soft (or virtual) button, such as the touching of a graphical icon when the device comprises a touch sensitive screen, a movement of the device (e.g. detected by one or more accelerometers in the device), an audio input, a gesture input (e.g. on a touch sensitive screen or in a portion of the environment detectable by a suitable sensor), or any combination thereof. For example, a user may activate a hard or soft button so as to indicate to the device that a predetermined movement of the device, audio input or gesture input is to be expected; this subsequent predetermined movement or input being the event.

The time of the event is determined based on data wirelessly received at the first and second devices, thereby allowing the first and second devices to use a common time source in order to assign times to the determined events. In other words, a timing means, e.g. clock, of the first device is preferably synchronous with a timing means, e.g. clock, of the second device. In embodiments in which the devices comprise means for connecting to a remote server, such as a device capable of communicating with the mobile telecommunications network, then clocks of the devices can be synchronised using a time server. In other embodiments, and wherein the devices are not able to communicate with remote servers, the first and second devices can each comprise means for receiving navigation satellite signals, such as a global navigation satellite system (GNSS) receiver, e.g. a Global Positioning System (GPS) receiver or a GLONASS receiver. Such navigation satellite signals comprise a time value, and a timing means, e.g. clock, of the first and second devices can be synchronised using the received time values.

When the occurrence of an event is detected on the device, a current time value is obtained from the respective timing means, e.g. clock, and stored in a memory of the device. On the second device, the determined time is used to set an identifier for the device; the identifier being associated with a communications protocol of a communication unit within the device that can be used to exchange data with the first device. For example, the (public) name of the second device can be changed to a text string created using the determined time of the event.

The first device further comprises a communication unit that operates using the same communication protocol, and preferably performs a search for any devices within range. As a result of this search, the first device preferably receives an identifier from each device within range that is discoverable—it will be understood that some devices can be set to be undiscoverable, such that they will not respond to a search request from the first device. The first device may receive just the identifier from the second device, but will typically receive identifiers from a plurality of devices. In this latter embodiment, the first device analyses each identifier to determine if it is of a predetermined (or expected) format, and when such an identifier is found (i.e. the identifier of the second device) it is used to determine a time of the occurrence of the event at the second device. In embodiments, the second device sends the identifier to the first device upon receipt of request to do so from the first device, e.g. as part of a discovery process.

The first device may retrieve the time value from the memory indicative of the time of the event at the first device, and compare this time value to that determined from the received identifier of the second device. In other words, the method may comprise comparing the time of the event at the first event with the time of the event at the second device as determined from the identifier. In the present invention, the event at the first device is intended to occur substantially simultaneously with the event at the second device. Accordingly, when the time value determined from the received identifier is within a predetermined time window of the time value obtained from the memory, then a connection request can be transmitted from the first device to the second device to establish a connection between the devices.

The predetermined time window can be of any desired value, and is used to account for small differences between the times at which the events are performed at the respective devices. For example, the time window can be about five seconds (s), or can take a smaller value such as about two seconds or one second. In embodiments, the time widow can be centred on the time of the event at the first device, and a determination is made as to whether the time derived from the identifier (i.e. the time of the event at the second device) is within a predetermined threshold, e.g. 1 second or 500 milliseconds (ms), above or below the time of the event at the first device.

In embodiments, the time value derived from the received identifier may not match the time value obtained from the memory of the first device. This can happen, for example, when the events did not occur simultaneously, if the devices move out of range, or if the identifier of a device is still set to an earlier time (based on a previous exchange of data). In such embodiments, the first device does not attempt to establish a connection, and may provide a suitable failure message to a user.

As described above, when the time determined from the received identifier is within a predetermined window of the determined time of the event at the first event, the first device wirelessly sends a connection request to the second device to establish a connection between the devices enabling data communication therebetween. The second device preferably accepts the received connection request, thus establishing a connection. In embodiments, the second device may only accept the connection request if it is received within a predetermined period of time, e.g. such as a predetermined time after the receipt of a user input initiating the exchange process, a predetermined time after the occurrence of the event, or a predetermined time after the transmittal of the device identifier during the discovery phase.

In embodiments, data is exchanged between the first and second devices over the established connection. Typically data is transmitted from the first device to the second device, although it will be appreciated that data may additionally or alternatively be transmitted from the second device to the first device. The data that is exchanged may be selected at any time, and may, for example, be selected after the connection is established. Preferably, however, the data is selected before the connection is established, and indeed preferably before the initiation of the discovery and connection process. For example, a user of the first device may firstly select the data they wish to transfer (or share) with the second device, and then perform the steps needed to establish the connection, e.g. by performing the event. In this embodiment, the connection between the first and second devices can be closed when the selected data has been shared. Accordingly, in embodiments of the present invention, the connection between devices is both automatically opened and closed.

The first and/or second devices described herein are preferably portable devices, optionally handheld devices or devices to be carried or worn by a person. In embodiments, the first and/or second devices are navigation devices, which are capable, for example, of planning a route from an origin to a destination using a digital map, and providing guidance instructions in respect of the planned route.

In embodiments, and wherein the first and second devices are navigation devices, the data that is sent from one device to the other preferably comprises data for use in a navigation operation, such as one or more of: data representative of a destination (e.g. geographic coordinates); data representative of points of interests (e.g. geographic coordinates); and data representative of a route to be traveled. In preferred embodiments, a route to be traveled is planned on the first device, and the data that is transmitted to the second device allows the route to be reconstructed on the second device. In other words, the data to be exchanged may comprise data that can be used to reconstruct a route, and can include a destination and/or routing planning options (e.g. shortest route, fastest route, avoid highways, etc).

The present invention further encompasses the first and second devices used in the methods described above.

Accordingly, in another aspect of the present invention, there is provided a portable electronic device, comprising:
a communication device for wirelessly communicating data;
a receiver for wirelessly receiving data from which time can be determined;
a device for determining an occurrence of an event at the portable electronic device; and
a processor arranged to:
determine a time of the event at the portable electronic device based on data received by the receiver;
use an identifier received by the communication device to determine a time of the occurrence of an event at another portable electronic device; and
send a connection request to the other portable electronic device using the communication device to establish a connection between the electronic devices enabling wireless data communication therebetween, when the time determined from the received identifier is within a predetermined time window of the determined time of the event at the portable electronic device.

In another aspect of the present invention, there is provided a portable electronic device, comprising:
a communication device for wirelessly communicating data;
a receiver for wirelessly receiving data from which time can be determined;
a device for determining an occurrence of an event at the portable electronic device; and
a processor arranged to:
determine a time of the event at the portable electronic device based on data received by the receiver;
set an identifier of the portable electronic device for transmittal by the communication device using the determined time of the event;
send the identifier to another portable electronic device using the communication device; and
receive a connection request from the other portable electronic device to establish a connection between the electronic devices enabling wireless data communication therebetween.

It will be appreciated that a portable electronic device can contain the features of both aspects provided above, and thus is capable of acting as both a sender and a receiver. In other words, a portable electronic device is both capable of initiating a connection with another device (and optionally transmitting information thereto) and accepting a connection request from another device (and optionally receiving information therefrom).

Embodiments of the present invention relate to the transfer of information using a short-range wireless communication protocol, such as a Bluetooth or Wi-Fi protocol. Thus, in embodiments, the messages exchanged between the first and second devices in order to establish a connection are preferably Bluetooth or Wi-Fi messages. In such examples, the data connection between the electronic devices comprises tuning the communication devices of both electronic devices to the same frequency at the same time, e.g. such that the two devices are paired. It will be appreciated, however, that the present invention is applicable to any other short-range wireless communication protocol as desired.

As discussed above, the receiver of the electronic devices preferably receives data from a common time source in order to assign times to the determined events. In embodiments, the receiver is arranged to receive navigation satellite signals, and thus can be a global navigation satellite system (GNSS) receiver, e.g. a GPS or GLONASS receiver.

In embodiments, the device for determining an occurrence of an event comprises one or more a motion sensors, such as at least one accelerometer, for detecting a movement of the device. Additionally, or alternatively, the device for determining the occurrence of an event comprises a user input device, such as one or more of a button (or other control), microphone, touch sensitive display screen, etc.

As described above, the present invention relates to establishing a data connection channel between portable electronic devices, i.e. devices that can be moved from one location to another. Such devices can be hand-held devices, e.g. mobile phones, tablet computers, etc, or may be associated with (or embedded in) a vehicle.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a device comprising data processing means (e.g. one or more processors) causes, in conjunction with said data processing means, said device to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following description.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention will now be described with particular reference to a Portable Navigation Device (PND). It should be remembered, however, that the teachings of the present invention are not limited to PNDs but are instead universally applicable to any type of processing device. The processing device may be configured to execute navigation software in a portable manner so as to provide route planning and/or navigation functionality, and thus can be referred to as a navigation device, and can be embodied, for example, as a PND, a system of a vehicle such as an automobile, a portable personal computer (PC), a mobile telephone or a Personal Digital Assistant (PDA).

Further, embodiments of the present invention are described with reference to a road network. It should be realised that the invention may also be applicable to other navigable networks, such as pedestrian paths, rivers, canals, cycle paths or the like.

Figure 1:
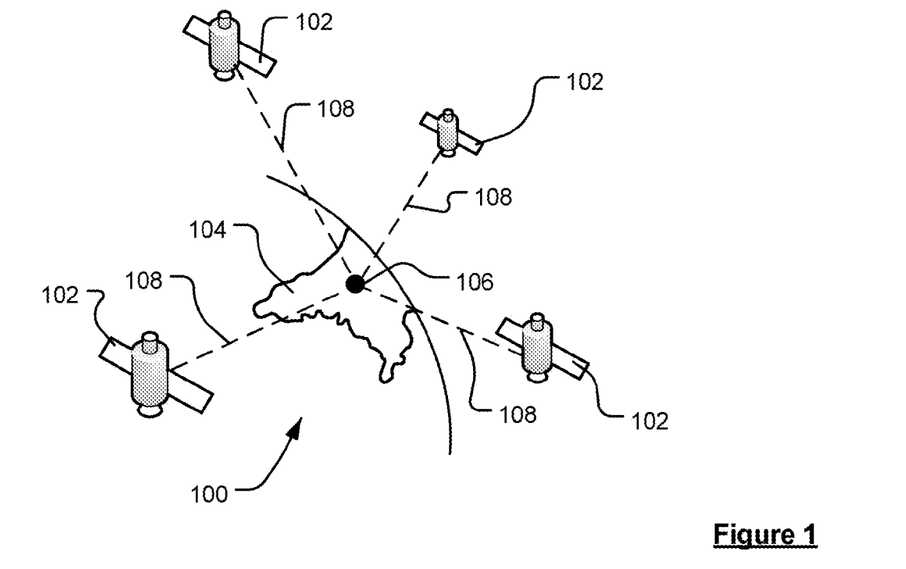
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
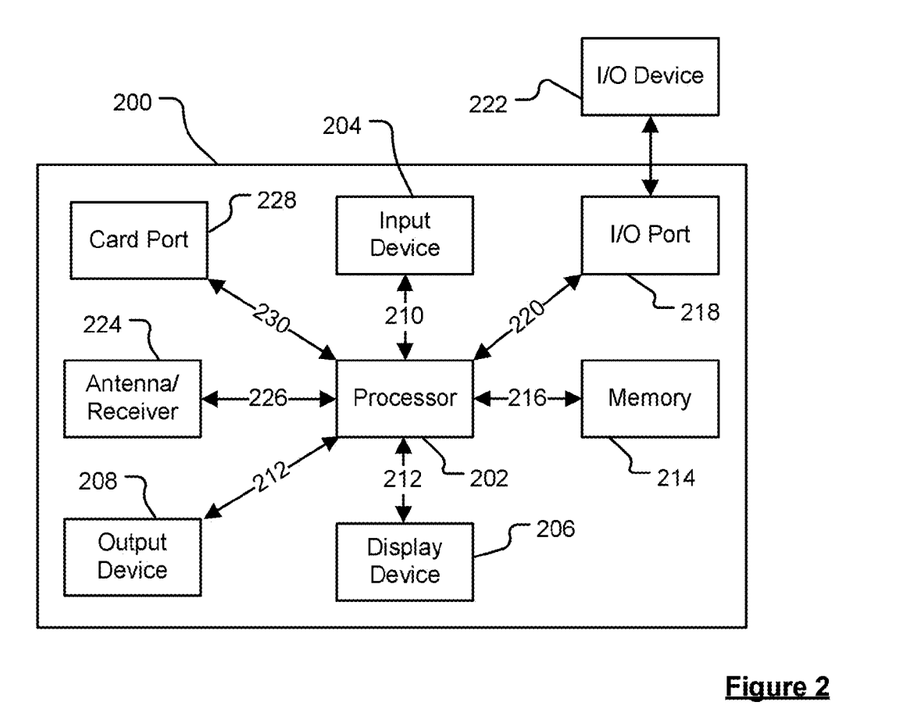
FIG. 2 is a schematic illustration of electronic components of an exemplary navigation device.

An exemplary navigation device 200, e.g. PND, is shown in FIG. 2; it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the input device 204 and the display screen 206 are integrated so as to provide an integrated input and display device, including a touchpad or touchscreen input 250 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200.

FIG. 2 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 2 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 2 are contemplated. For example, the components shown in FIG. 2 may be in communication with one another via wired and/or wireless connections and the like. Thus, the navigation device 200 described herein can be a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Embodiments of the present invention provide a method for sharing data between devices. The method enables convenient connection of devices to share data. The devices may be connected absent an internet connection, such as required to communicate with a server computer.

Figure 3:
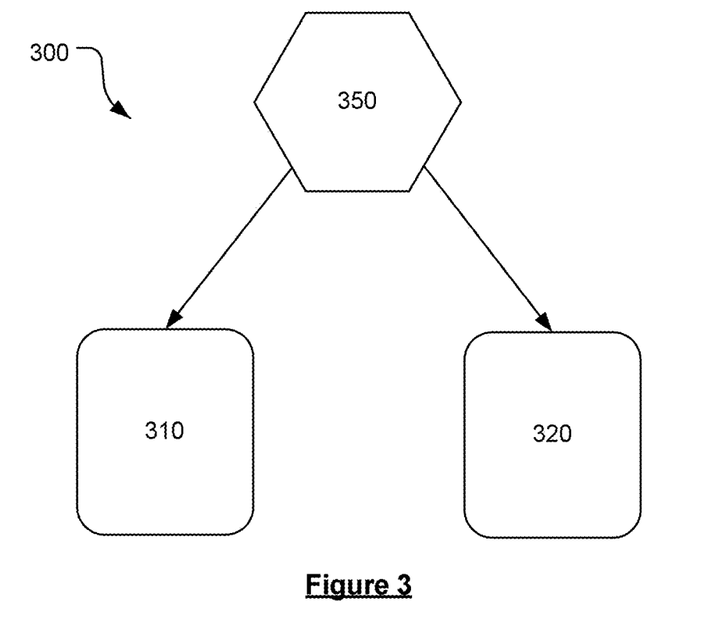
FIG. 3 shows an illustration of a system according to an embodiment of the invention.

FIG. 3 illustrates a system 300 according to an embodiment of the invention. The system 300 comprises a first device 310 and a second device 320. The first and second devices 310, 320 may be mobile devices, such as portable computing devices, mobile telephones, tablet computers, etc. It will be realised that the first and second devices 310, 320 do not have to be the same type of device.

The devices 310, 320 receive, in use, wirelessly transmitted signals 351 from a transmitter 350 which may be a satellite, although it will be realised that other sources of wireless signals may be envisaged. The signals 351 provide a synchronised source of time information to the first and second devices 310, 320.

Figure 4:
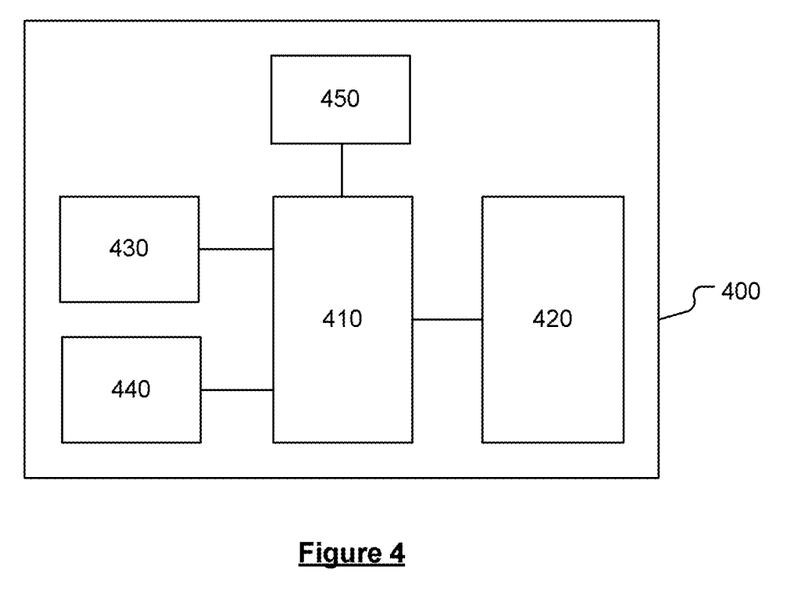
FIG. 4 shows a schematic diagram of a device according to an embodiment of the invention.

FIG. 4 illustrates, in schematic form, a device 400 which corresponds to each of the first and second devices 310, 320. The device 400 comprises a processing unit 410 for operably executing instructions forming computer software stored in a memory 420 of the device 400. The memory 420 may also store data which it is desired to share, such as data indicative of a route, etc.

The device 400 comprises a receiver device 430 for wirelessly receiving data. The receiver 430 is for receiving wireless signals from which a synchronised time of an event may be determined at each of the first and second devices 310, 320. The receiver 430 may be a receiver for receiving wireless navigation signals. The navigation signals may be Global Position System (GPS) signals, Galileo, GLONASS, etc. In the case of GPS signals a time may be determined by the first and second devices 310, 320 receiving signals from GPS satellites from which a time may be determined based on "GPS time" and a correction for UTC time, As known in the art. Thus both the first and second devices 310, 320 receiving the GPS signals are able to determine UTC time in synchronisation.

It will be realised that synchronised time may also be determined from other types of wireless signal, such as radio signals indicative of time such as the MSF radio time signal or other signals such as broadcast over wireless networks.

The device 400 further comprises a data communication unit 440 for wirelessly communicating data with another device. The communication unit 440 may be operable according to a relatively short-range communication protocol. The protocol may allow data transfer between the devices 310, 320. The protocol may be one in which devices are at least temporarily associated or "paired" to establish a connection for data communication. The communication unit 340 may operate according to a Bluetooth protocol. Under the Bluetooth protocol at least one of the first and second devices 310, 320 performs a searching process to determine other Bluetooth devices within a range of communication. As well as a hardware address of each device, Bluetooth devices may also have a local name which allows convenient establishment of an identity of the device. Frequently the local name is set by a user in order to conveniently identify the device. The local name is a string stored in the device and communicated in a field of a Bluetooth packet for identification of the device, as will be appreciated.

The device 400 comprises a user input device 450. The user input device 450 is provided for receiving a user input event. The user input event may be a motion of the device including a jolt or gentle impact, as will be explained. Thus in this embodiment the user input device may comprise an accelerometer. However in other embodiments the user input device comprises a means for receiving a user input in the form of a control such as a physical button or switch, or in the form of a displayed graphical icon such as presented on a display device capable of receiving the user's input such as touch sensitive display. The user input may also be an audio input in some embodiments.

In an illustrative embodiment, the first and second devices 310, 320 are navigation devices. It will be understood that a navigation device is a device capable of route guidance between geographic locations. The route guidance may be visually displayed and/or audio instructions. The navigation devices 310, 320 may be devices which are dedicated to providing navigation functionality or may be generic devices which operably execute navigation software, such as a mobile phone, for example.

It may be desired for navigation devices to share data in order to share data indicative of a route planned on a navigation device, a route previously followed, such as by a vehicle associated with the navigation device, a point of interest (POI), i.e. a geographic location at which a feature of interest is located, a location visited by the navigation device, etc. It will be realised that the aforementioned list is not exhaustive and that other types of data may be shared between the devices.

Figure 5:
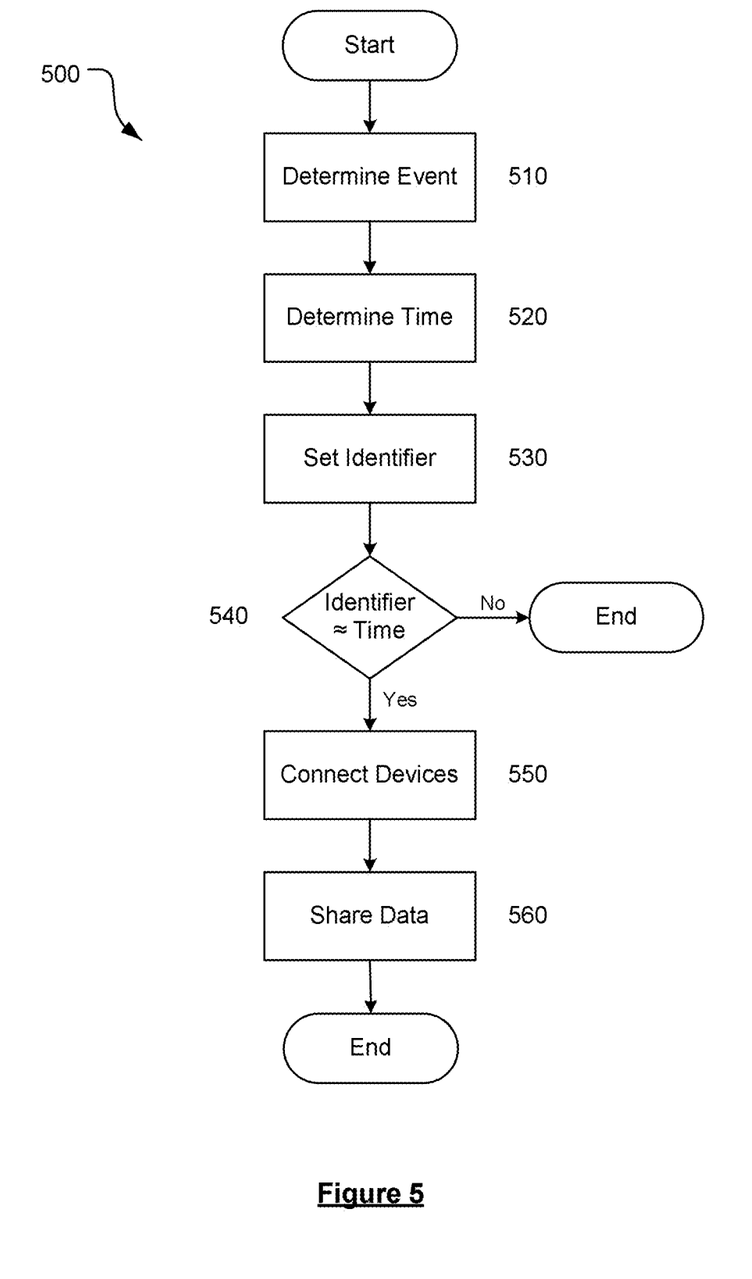
FIG. 5 shows an illustration of a method according to an embodiment of the invention.

FIG. 5 illustrates a method 500 according to an embodiment of the invention. The method 500 is a method of associating devices, i.e. establishing a connection between devices, for sharing data therebetween.

Prior to execution of the method 500 a user of at least one of the first and second devices 310, 320 may have identified data to be shared with the other device. For example the user of the first device 310 may identify one or more files, such as pictures, documents, images, etc., which they wish to share with the second device 320. In one embodiment of the invention the user of the first device 310 may identify a route to be shared with the second device 320, for example to allow the user of the second device 320 to follow the route. The user of the first device 310 may operate the first device 310 to enter a sharing mode and to identify the data, such as the route, to be shared. However the user of the first device 310 does not need to identify the device with which the data is to be shared. The method 500 allows identification of the second device 320 and an at least temporary connection to be established between the devices 310, 320.

The method 500 comprises a step 510 of determining an event at each of the first and second devices 310, 320. The event is indicative of a desire to share data between the first and second devices 310, 320. The event may be a user input received at each of the first and second devices 310, 320 such as operation of a switch, button, activation of a displayed graphical icon or receipt of an audio input at each of the first and second devices 310, 320. In other embodiments, the event may be a specific gesture performed by the user, such as on a touch sensitive display or in range of a motion capture sensor.

In one embodiment the event is detection of a physical movement at each of the first and second devices 310, 320. The physical movement may be a bump or jolt of each device 310, 320 which results in an acceleration having a magnitude of more than predetermined level being experienced by the device 310, 320. The acceleration may be detected by the user input device 450 and information indicative thereof provided to the processing unit 410. The event may be provided independently to each of the first and second devices 310, 320, i.e. each device receiving a different user input, such as the movement or audio input. However it may be more convenient, as will be appreciated from what follows, for each device 110, 120 to receive the same event which may be caused by the first and second devices 310, 320 being bumped or gently banged together. In this way the event at the first and second devices 310, 320 is synchronised, i.e. occurs at the same time.

In step 520 a time of the event at each of the first and second devices 310, 320 is determined. The time at each of the devices is determined by the respective device from the wireless signals, such as the navigation signals, received by the receiver 430. In this way each device 310, 320 is able to determine the time of the event at the respective device based upon the same reference time source. A time of the event may be stored in the memory 420 of each device 310, 320.

In step 530 at least one of the devices 310, 320 sets an identifier of the device to information indicative of the time determined in step 520. For example the second device 320 may set its identifier to be a string corresponding to the time of the event determined in step 520. The identifier is an identifier used by the communication protocol of the communication unit 440. For example the second device 320 may set its local name as HH:MM:SS where HH is indicative of the hour, MM is indicative of the minutes and SS indicative of the second of the event. It will be realised that, if desired, the determined time may also include greater precision, for example, tenths of seconds.

A search or pairing process is then performed by at least one of the devices 310, 320. The pairing process first determines an identity of any devices in a communication range of the device. The pairing process may be performed by the first device 310 searching and requesting identifying information from other devices within range of a signal of the communication unit 440. The identifying information comprises the identifier set in step 530. For example the first device 310 may perform a search process and be provided with the local name of the second device 320. It will be noted that the identifier may not directly provide the time. Instead the identifier may be based upon the time, such as being a hashed or encoded representation of the time determined in step 520.

In step 540 it is determined whether a time obtained from the identifier of the device 320 matches the time of the event determined in step 520 by the other device 310. That is, a comparison is performed between the time of the event at one device, such as the first device 310, and the time derived from the identifier of the other device, such as the second device 320. If the times correspond, at least within a predetermined time window, an association (or connection) may be made between the first and second devices 310, 320. For example the times may be determined to match if the time of the event at the first device 310 is within a predetermined time of the event provided by the second device 320. The predetermined time window may be ±1 second or ±500 milliseconds, although it will be realised that these time values are merely exemplary.

If the time at one device 310 matches the time provided by the other device 320 via the identifier then, in step 550, an association is made between the first and second devices 310, 320. The association is made via the communication protocol to enable data communication therebetween. The association may be a connection between the first and second devices 310, 320 for data communication. In the exemplary embodiment the first and second devices are paired via Bluetooth. The pairing enables data communication such as a sending of data, which may be one or more files, stored on the first device 310 to the second device 320. The association or paring between the devices 310, 320 may be terminated after communicating the desired data such that the association is temporary.

FIGS. 6A to 6D illustrate exemplary screens displayed on two portable electronic devices—navigation device A and navigation device B—as a method according to an embodiment is performed.

Figure 6A:
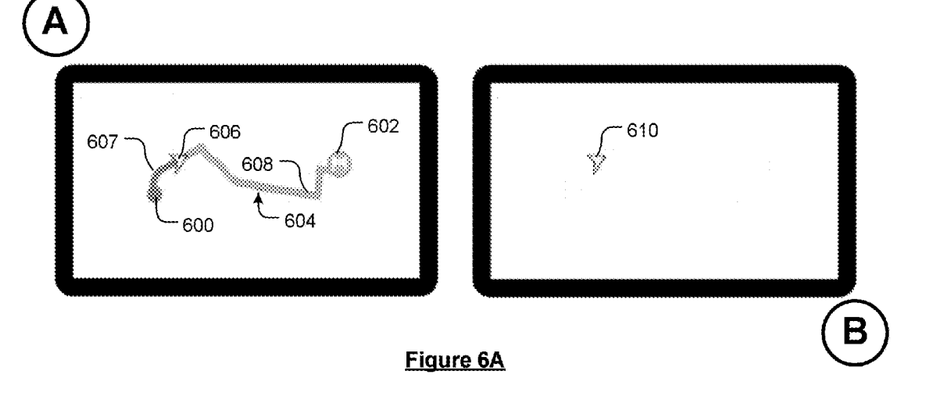
FIGS. 6A to 6D illustrate exemplary screens displayed on two portable electronic devices as a method according to an embodiment of the invention is performed.

In FIG. 6A, the screen of navigation device A shows a route 604 that has been calculated between an origin 600 and a destination 602 using an electronic map, and which is currently being traversed by the user of the device A. An icon 606 is also shown indicating the current position of the device along the route 604; therefore the device has already traveled the route portion 607 and still has to travel the route portion 608. The screen of navigation device B merely shows the current location 610 of the device, since the user of the navigation device has not yet planned a route.

Figure 6B:
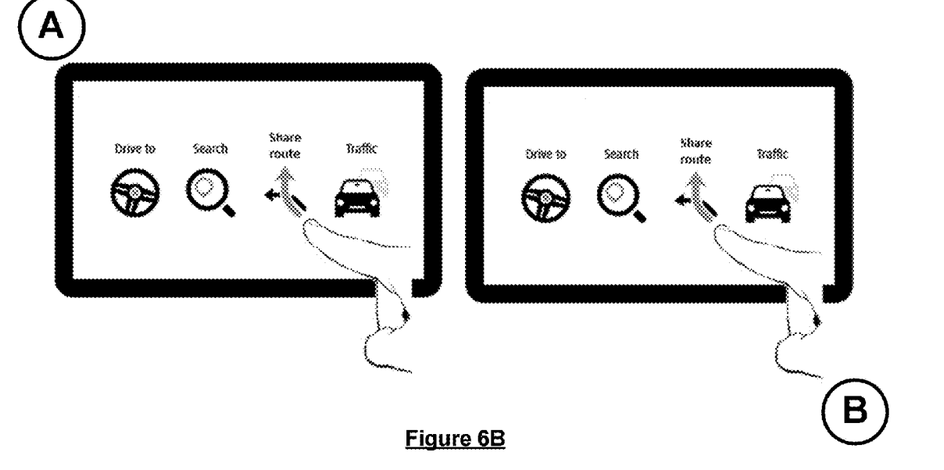

In FIG. 6B, the users of both devices A and B enter a menu screen, and select the 'share route' icon. This selection provides an indication to the device that an event is to be expected. As will be appreciated, in this embodiment, the user is required performs a manual step to begin the process of establishing a connection between the devices on order to share information. This means that the device does not need to continually monitor for a predetermined event. It is possible, however, that this manual step, i.e. as shown in FIG. 6B, can be removed, and that the device is always monitoring to detect the occurrence of an event of a predetermined type.

Figure 6C:
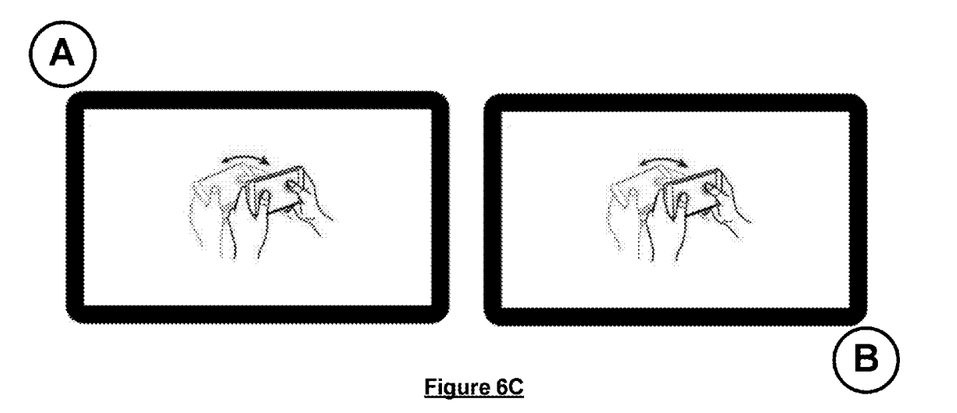

In FIG. 6C, the screen of the devices A and B (after selection of the 'share route' icon) provides an indication to the user of the action that needs to perform to trigger the establishment of the data connection between the two devices. In this example, the user is asked to tilt their device back and forth, possibly a number of times, e.g. 2 or 3 times. This movement is detected by the device as the 'event' of the method, and in response the device will determine the time of the event and use this information, as described above, to establish a connection between the two devices.

Figure 6D:
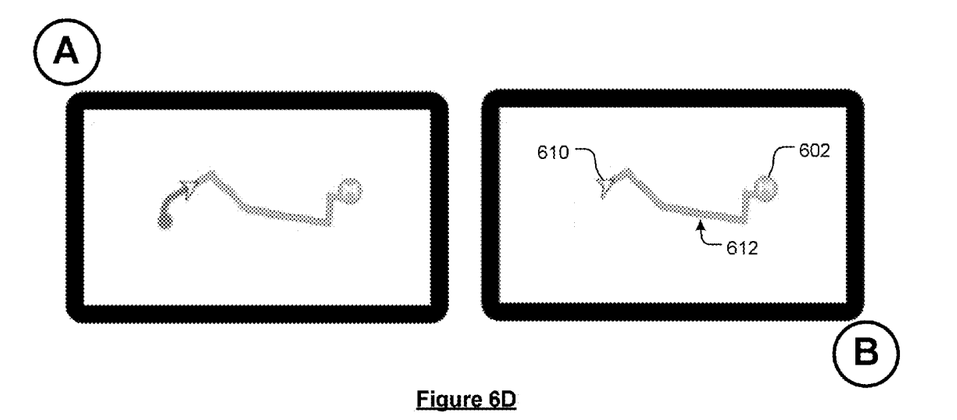

Upon the connection being formed, device A transmits information about the planned route 604 to device B. This information may simply comprise the destination location 602, and the processor of navigation device B can plan a route 612 to the destination location 602 from the current location 610. In order to ensure that the route 612 of device B matches the route portion 608 of device A, the information transmitted to device B may additionally include route preferences to be used in determining the route on device B, e.g. that the route to be planned is the fastest route, shortest route, etc to the destination, that certain sections of the road network are to be avoided, etc. In embodiments, the information transmitted to device B could include data that permits the device to reconstruct the exact path of route portion 608.

After the information has been transmitted to device B, device A closes the connection between the devices.

It will be appreciated that embodiments of the present invention can be realised in the form of hardware, software or a combination of hardware and software. Thus, any of the methods in accordance with the present invention may be implemented at least partially using software, e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of establishing a connection between first and second portable electronic devices, comprising:
   determining an occurrence of an event at a first portable electronic device;
   determining a time of the event at the first device based on data wirelessly received at the first device;
   wirelessly receiving, at the first device, an identifier for a second portable electronic device, the identifier being a local name of the second device, wherein the local name is a representation of a time of an occurrence of an event at the second device;
   using the received identifier to determine, based on the representation of the time of the event the second device in the received identifier, the time of the occurrence of the event at the second device; and
   wirelessly sending a connection request from the first device to the second device to establish a connection between the first and second devices enabling wireless data communication therebetween, when the time determined from the received identifier is within a predetermined time window of the determined time of the event at the first device.

2. The method of claim 1, comprising comparing the time determined from the received identifier with the determined time of the event at the first device.

3. The method claim 1, wherein the predetermined time window is between about 2 seconds and about 500 milliseconds.

4. The method of claim 1, comprising a communication device of the first device searching for other portable electronic devices within range of the communication device, and receiving the identifier for the second device in response to the search.

5. The method of claim 1, comprising:
   determining the occurrence of the event at the second device;

determining the time of the event at the second device based on data wirelessly received at the second device;
setting the identifier of the second device using the determined time of the event at the second device, the setting comprising setting, in the identifier, a local name of the second device to be a representation of the time of the event at the second device;
wirelessly transmitting the identifier to the first device; and
wirelessly receiving the connection request at the second device.

6. The method of claim 1, wherein the data wirelessly received at the second device comprises satellite navigation signals.

7. The method of claim 1, wherein the connection between the first and second devices is formed using a short-range communication protocol.

8. The method of claim 1, wherein the event is a user input received at the respective device.

9. The method of claim 8, wherein the user input is at least one of: an activation of a hard button; a selection of a graphical icon; a movement of the device; an audio input; and a gesture input.

10. The method of claim 1, comprising transferring data between the first and second devices using the established connection.

11. A non-transitory physical storage medium comprising computer readable instructions that, when executed on at least one processor of a portable electronic device, cause the device to perform the method as claimed in claim 1.

12. A method of establishing a connection between first and second portable electronic devices, comprising:
determining an occurrence of an event at a first portable electronic device;
determining a time of the event at the first device based on data wirelessly received at the first device;
setting an identifier of the first device using the determined time of the event at the first device, the setting comprising setting, in the identifier, a local name of the first device to be a representation of the time of the event at the first device;
wirelessly transmitting the identifier to a second portable electronic device; and
wirelessly receiving a connection request from the second device to establish a connection between the first and second devices enabling wireless data communication therebetween.

13. The method of claim 12, wherein the data wirelessly received at the first device comprises satellite navigation signals.

14. A non-transitory physical storage medium comprising computer readable instructions that, when executed on at least one processor of a portable electronic device, cause the device to perform the method as claimed in claim 12.

15. A portable electronic device, comprising:
a communication device for wirelessly communicating data;
a receiver for wirelessly receiving data from which time can be determined;
a device for determining an occurrence of an event at the portable electronic device; and
a processor arranged to:
determine a time of the event at the portable electronic device based on data received by the receiver;
use an identifier received by the communication device to determine a time of the occurrence of an event at another portable electronic device, the identifier being a local name of the other portable electronic device, wherein the local name is a representation of the time of the occurrence of the event at the other portable electronic device; and
send a connection request to the other portable electronic device using the communication device to establish a connection between the electronic devices enabling wireless data communication therebetween, when the time determined from the received identifier is within a predetermined time window of the determined time of the event at the portable electronic device.

16. A portable electronic device as claimed in claim 15, wherein the portable electronic device is a navigation device operable to determine a route to be traveled from a first location to a second location using a digital map and to provide instructions to guide a user along the determined route.

17. A portable electronic device, comprising:
a communication device for wirelessly communicating data;
a receiver for wirelessly receiving data from which time can be determined;
a device for determining an occurrence of an event at the portable electronic device; and
a processor arranged to:
determine a time of the event at the portable electronic device based on data received by the receiver;
set an identifier of the portable electronic device for transmittal by the communication device using the determined time of the event, the setting comprising setting, in the identifier, a local name of the second electronic device to be a representation of the time of the event;
send the identifier to another portable electronic device using the communication device; and
receive a connection request from the other portable electronic device to establish a connection between the electronic devices enabling wireless data communication therebetween.

18. A portable electronic device as claimed in claim 17, wherein the portable electronic device is a navigation device operable to determine a route to be traveled from a first location to a second location using a digital map and to provide instructions to guide a user along the determined route.

* * * * *